United States Patent [19]

Karlsson et al.

[11] Patent Number: 4,889,455
[45] Date of Patent: Dec. 26, 1989

[54] DRILL

[75] Inventors: Kurt O. Karlsson, Sandviken; Leif E. Karlsson, Karlholmsbruk, both of Sweden

[73] Assignee: Sandvik AB, Sandviken, Sweden

[21] Appl. No.: 195,609

[22] Filed: May 18, 1988

[30] Foreign Application Priority Data

May 21, 1987 [SE] Sweden ............................. 8702106

[51] Int. Cl.⁴ ........................................... B23B 51/02
[52] U.S. Cl. ................................... 408/188; 408/194; 408/211; 408/224; 408/227; 408/713
[58] Field of Search ............... 408/186, 187, 188, 189, 408/194, 199, 200, 211, 223, 224, 227, 229, 230, 233, 713; 407/61

[56] References Cited

U.S. PATENT DOCUMENTS

| 3,963,365 | 6/1976 | Shallenberger, Jr. | 408/186 |
| 4,293,252 | 10/1981 | Kress et al. | 408/224 |
| 4,563,113 | 1/1986 | Ebenhoch | 408/199 |
| 4,676,702 | 6/1987 | Reinauer | 408/188 |

FOREIGN PATENT DOCUMENTS

| 104604 | 6/1985 | Japan | 408/200 |
| 81-03137 | 11/1981 | PCT Int'l Appl. | 408/199 |
| 173093 | 8/1965 | U.S.S.R. | 408/186 |
| 1055592 | 11/1983 | U.S.S.R. | 408/199 |
| 1119787 | 10/1984 | U.S.S.R. | 408/199 |
| 1200127 | 7/1970 | United Kingdom | 408/188 |
| 1559155 | 1/1980 | United Kingdom . | |

Primary Examiner—Daniel Howell
Attorney, Agent, or Firm—Burns, Doane, Swecker & Mathis

[57] ABSTRACT

A drill for stack drilling comprises a drill body, a central cutting insert, and a peripheral cutting insert. The inserts have active cutting edges arranged such that the drill successively cuts radially outwardly from the center of the drill in order to avoid the formation of breakout slugs. The active cutting edge of the central insert has three cutting edge portions forming obtuse angles with one another. The radially innermost one of those cutting edge portions is shorter than each of the other two cutting edge portions.

13 Claims, 3 Drawing Sheets

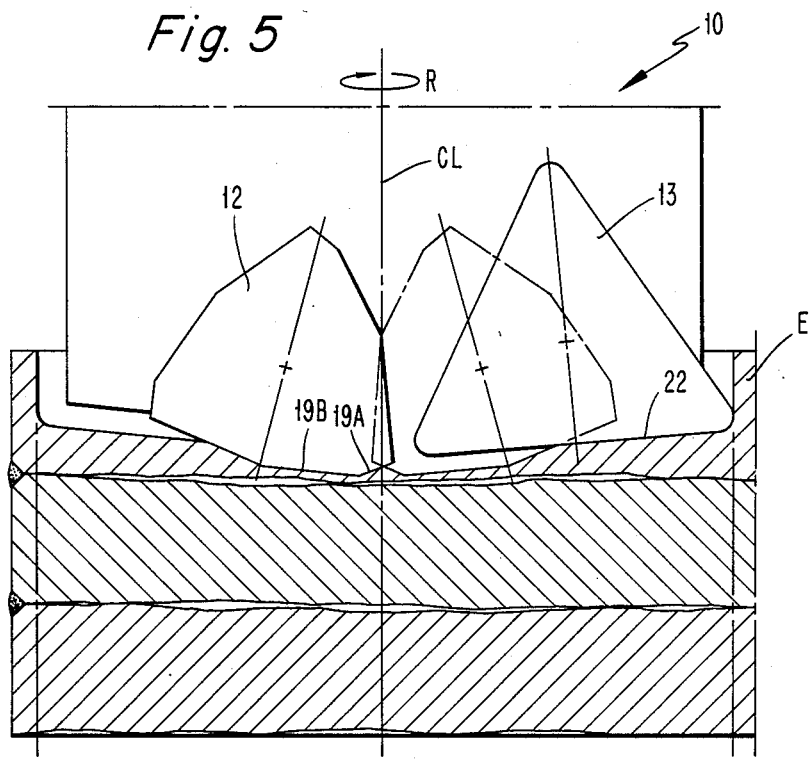
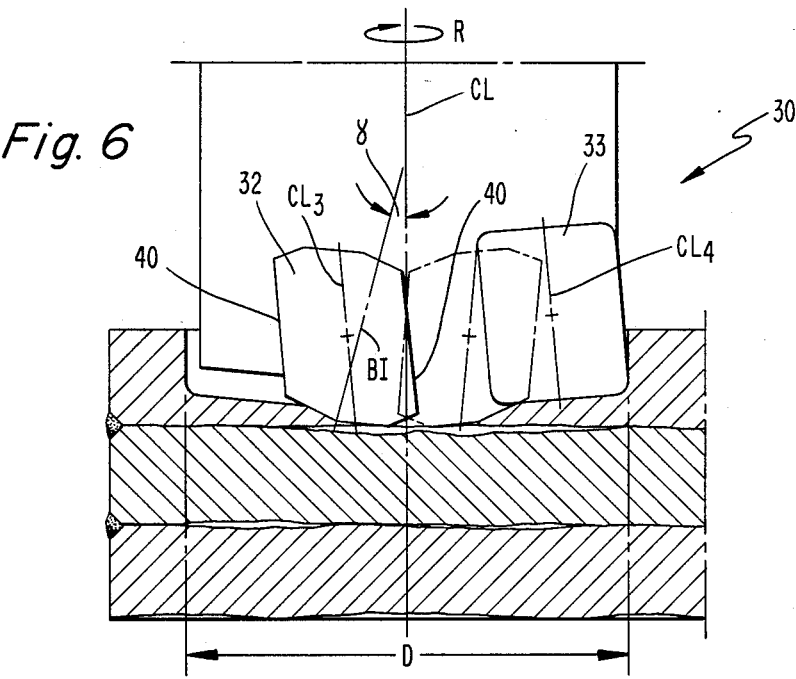

DRILL

BACKGROUND AND OBJECTS OF THE INVENTION

The invention relates to a drill for drilling of stacked work pieces. The drill comprises a drill body having chip flutes and a first cutting insert releasably secured to a first cutting insert site of the drill body and a second cutting insert releasably secured to a second cutting insert site of the drill body. The cutting inserts are provided on opposite sides of a first center line of the drill in the axially forward end of the drill. The drill has a cylindrical basic shape which is defined by a diameter and is rotatable about the first center line. The first cutting insert is provided at least partly radially inside the second cutting insert.

A known drill has two identical hexagonal indexable cutting inserts arranged in recesses in the front surface of the drill shank. The active cutting edges of the cutting inserts are broken such that the bisector of each cutting edge becomes parallel with the center line of the drill.

At drilling there is usually formed a breakout slug when drilling through a work piece. During drilling of stacked work pieces when plates are stacked on top of each other, said slug cannot disappear from the machining area since an adjacent plate prevents the movement of the slug. The slug will rotate with the known drill until the feed force becomes large enough to break the slug. At this large feed force there is a risk for cutting edge and/or drill breakdown.

The object of the present invention is to solve the above-mentioned problem.

THE DRAWINGS

The invention will be more closely described hereinafter in connection with the appended drawings wherein:

FIG. 5 shows a drill according to the invention in engagement with a work piece, in a side view, and FIG. 6 shows an alternative embodiment of a drill according to the invention in engagement with a work piece, in a side view.

DESCRIPTION OF PREFERRED EMBODIMENTS OF THE INVENTION

Figure 1:
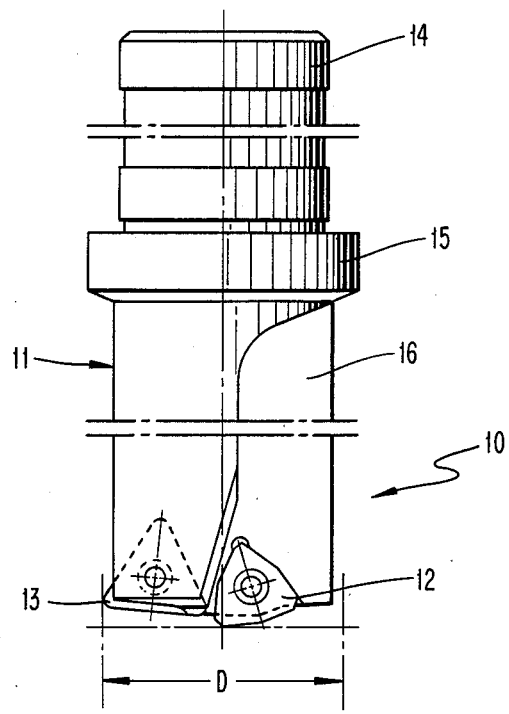
FIG. 1 shows a drill according to the invention, in a side view.
Figure 2:
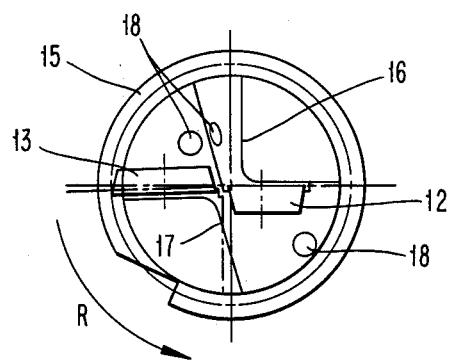
FIG. 2 shows the drill in a top view.
Figure 3:
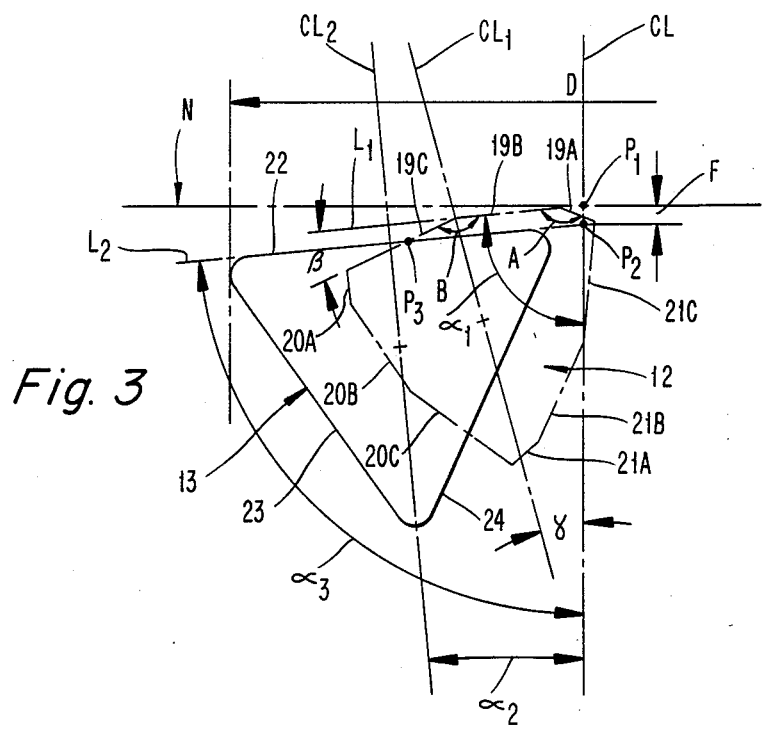
FIG. 3 shows the distribution of cutting inserts of the drill, in a side view.

FIGS. 1, 2 and 3 show a drill 10 according to the invention. The drill comprises a drill body 11 and two cutting inserts 12, 13. The drill body has a cylindrical basic shape which is defined by a diameter D. The drill body has a shank 14, an abutment and drive flange 15, two straight or screw-shaped chip flutes 16, 17 and two cutting insert sites arranged on opposite sides of the center line CL of the drill. The drill body also has passages 18 for a flush medium.

The cutting insert sites are provided to receive two different cutting inserts 12, 13 which are attached by screws to the drill body. A first cutting insert 12, the so-called central cutting insert, is provided in a site which intersects the center line of the drill and which does not reach the circumferential periphery of the drill. The central cutting insert 12 has a hexagonal basic shape comprising nine cutting edges 19A, B and C; 20A, B and C and 21A, B and C, whereof three are active at the same time.

A second cutting insert 13, the so-called peripheral cutting insert, has a triangular basic shape and is of a conventional type. FIG. 3 shows a distribution of cutting inserts for the drill according to the invention. The peripheral cutting insert 13, which is depicted by a solid line, has three cutting edges 22, 23 and 24. The cutting edges meet at three cutting corners in rounded nose portions. The cutting insert 13 has an active cutting edge 22 which extends from the circumferential periphery of the drill in a direction radially inwardly to a point arranged at a distance from the rotary axis or center line CL. The cutting insert 13 has a center line $CL_2$, which forms an angle $\alpha_2$ with the center line CL of the drill. The center line $CL_2$ coincides with a bisector of the cutting insert. The active cutting edge 22 forms an angle $\alpha_3$ with the center line CL and the angle $\alpha_3$ is complementary to the angle $\alpha_2$. The angle $\alpha_2$ is 0 to 30 degrees, preferably about 5 degrees and the angle $\alpha_3$ is 60 to 90 degrees, preferably about 85 degrees.

The central cutting insert 12 is shown in FIG. 3 as a dotted line since the cutting insert 12 comes after the cutting insert 13 in the rotational direction R. The cutting insert 12 lies about 182 degrees behind the cutting insert 13 in the rotational direction. For illustration purposes the cutting inserts are shown simultaneously on the same side of the center line CL. The cutting insert 12 has three active cutting edges 19A, 19B and 19C forming obtuse angles A and B. The cutting insert 12 has a center line $CL_1$ which diverges axially forwardly from and forms an acute angle $\gamma$ with the center line CL of the drill. The angle $\gamma$ is 5 to 30 degrees. A first cutting edge 19A, which is shorter than each of the portions 19B, 19C and which is formed by a bevel in a cutting corner, forms an angle about 10 to 30 degrees with an extension line $L_1$ of a second cutting edge 19B. The cutting edge 19B in turn is broken by a third cutting edge 19C which forms an angle $\beta$ with said extension line $L_1$. The angle $\beta$ is 10 to 30 degrees, preferably 15 to 25 degrees. Next first cutting edge 20A forms an internal obtuse angle of about 110 degrees with the third cutting edge 19C. The first, second and third cutting edges 20A, B and C and 21A, B and C are inactive as cutting means in the shown position but may, if necessary, be indexed to an active position. However, the latter cutting edges have a mutual relationship which is identical with the above-described. The first cutting edge 19A is provided to slope about 20 degrees relative to a line N oriented perpendicular to the center line CL of the drill such that its break point with the second cutting edge 19B lies axially forwards of its break point with the third inactive cutting edge 21C. The cutting edge 19A intersects the center line of the drill and may thus cut to the very center of the drill. The second cutting edge 19B forms an angle $\alpha_1$ with the center line CL of the drill. The angle $\alpha_1$ is 60 to 90 degrees, preferably about 85 degrees. The extension line $L_1$ of the second cutting edge 19B intersects the center line CL of the drill in a point $P_1$. The active cutting edges 19A, B and C of the central cutting insert extend at least from the center line CL to a point provided at a distance radially inside of the periphery of the drill.

The cutting edges 19B and 19C form an obtuse internal angle about 120 to 170 degrees and the bisector of said angle coincides with the center line $CL_1$ of the cutting insert.

The active cutting edge 22 of the peripheral cutting insert 13 is provided to overlap the third cutting edge 19C of the central cutting insert 12 at point $P_3$. The position of the point $P_3$ is determined by the required diameter D of the drill. For the benefit of optimal force balance the lengths of the active cutting edges of the cutting inserts should be identical on opposite sides of the center line CL. Regarding, for example, drills with larger diameters, the cutting insert sites and the cutting edges are provided such that the point $P_3$ is moved radially outwardly and axially rearwardly, i.e., the peripheral site and the peripheral cutting insert are moved outwardly and rearwardly relative to the position shown in FIG. 3. However, the point $P_3$ will always be situated on the third cutting edge 19C. An extension line $L_2$ of the active cutting edge 22 of the peripheral cutting insert intersects the center line CL of the drill in a point $P_2$. The point $P_2$ always lies axially rearwardly of the above-described point $P_1$ and axially rearwardly with respect to an axially forwardmost end of the first cutting edge portion. The distance F between the points $P_1$ and $P_2$ is 0.01 to 0.05 times the diameter D of the drill. The diameter D of the drill is between 27 and 60 mm. The cutting inserts 12 and 13 are preferably single-sided and have chip breaker grooves in their chip surfaces.

Figure 4:
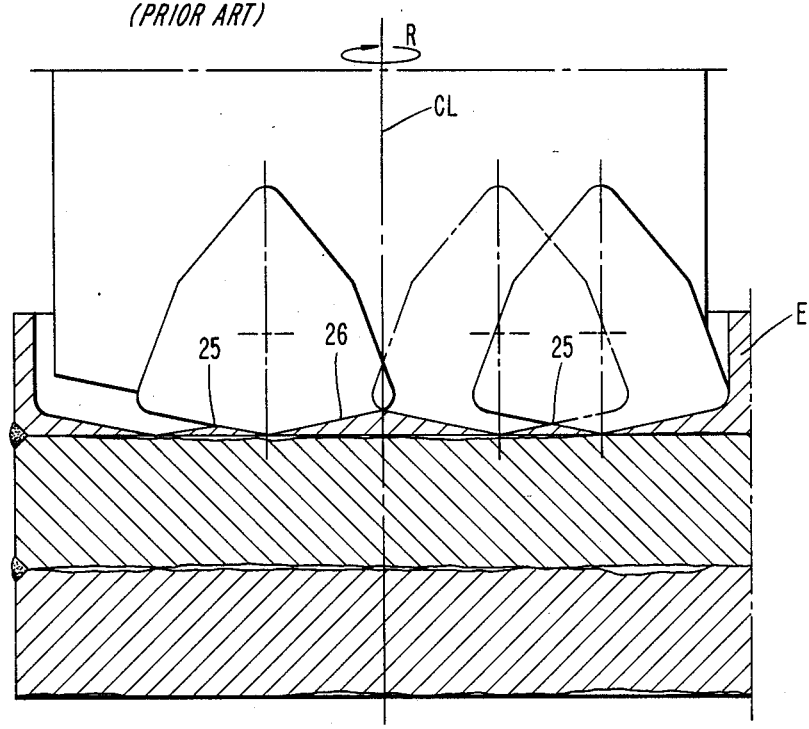
FIG. 4 shows a conventional drill in engagement with a work piece, in a side view.

FIG. 4 shows a conventional drill at stack drilling, i.e., drilling of a plurality of plates at the same time. The plates have for example been welded together at their rim portions. During drilling through the uppermost plate E, a ring 25 and a washer-shaped slug 26 are formed because of the shape of the peripheral cutting insert and the relation of the central cutting insert to the center line. The ring 25 and the slug 26 will rotate with the drill, thereby preventing further drilling until in the best case the feed force becomes large enough to break the ring and the slug. In the worst case the drill or the cutting inserts break down. Spaces often formed between adjacent plates facilitate formation of the ring and the slug.

FIG. 5 shows a drill 10 according to the invention at stack drilling. The above-mentioned problem caused by the ring and the slug is completely avoided by the drill 10 since the radially inner end of the second cutting edge 19B of the central cutting insert is the one firstly penetrating the plate E. Thus, the drill 10 cuts radially from the center and outwardly and therefor the harmful elements 25 and 26 cannot be formed. The reason for having the active cutting edges 19B and 22 spaced in the axial direction is to keep the material at the exit part of the hole stable as long as possible to obtain a clean cut of the hole. The cutting edge 19A forms a small conical portion at break-through of the first plate E, which easily is flushed away together with the chips by the flush medium.

FIG. 6 shows an alternative embodiment of a drill 30 according to the invention at stack drilling. The diameter of the drill is 15 to 27 mm. The central cutting insert 32 of the drill 30 has the basic shape of a parallelogram and has a center line $CL_3$ which converges axially forwardly 2 to 10 degrees relative to the center line CL of the drill. The cutting insert 32 has six cutting edges and two parallel non-cutting edges 40, and has two indexable positions. The shapes and the inclinations relative to the center line CL of the cutting edges are identical with the ones described in connection with FIG. 3. The bisector BI of the obtuse angle between two adjacent cutting edge portions forms, similar to the above-described, an acute angle with the center line CL but forms an acute angle with the center line $CL_3$. The peripheral cutting insert 33 has a rectangular basic shape comprising two cutting edges. The cutting insert 33 has a center line $CL_4$ which has the same inclination as the above-described center line $CL_2$. The active cutting edge of the cutting insert 33 is arranged in the same way as the above described cutting edge 22.

The configurations of the cutting inserts 32, 33 provide for the shaping of a drill, for stack drilling, with a relatively small diameter.

Thus the present invention relates to a drill whose shape allow for drilling of stacks without the formation of breakout slugs in order to avoid cutting insert and drill breakdown.

We claim:

1. A drill for stack drilling comprising a drill body having a drill diameter and provided with chip flutes, a first cutting insert releasably secured to a first insert site of said drill body, and a second cutting insert releasably secured to a second insert site of said drill body, said first and second inserts disposed mainly on opposite sides of a rotary axis of said drill body adjacent a forward end thereof, said first insert arranged at least partly radially inside of said second insert, said first insert having a first active cutting edge which includes first, second, and third cutting edge portions, said first cutting edge portion being disposed radially closer to said axis than said second and third cutting edge portions, said third cutting edge portion disposed radially farther from said axis than said first and second cutting edge portions, said second cutting edge portion interconnecting said first and third cutting edge portions and forming therewith inner and outer obtuse angles, respectively, said first cutting edge portion being shorter than each of said second and third cutting edge portions, a bisector of said outer obtuse angle being rearwardly convergent with respect to said axis and forming an acute angle therewith as said drill is viewed in a direction perpendicular to said axis, said second insert having a substantially straight second active cutting edge, a first imaginary extension of said second cutting edge portion of said first insert intersecting said axis at a first point as said drill is viewed in said direction, a second imaginary extension of said second cutting edge intersecting said axis at a second point as said drill is viewed in said direction, said first and second imaginary extensions forming substantially equal angles with said axis as said drill is viewed in said direction, said second point being spaced rearwardly with respect to a forwardmost end of said first cutting edge portion.

2. A drill according to claim 1, wherein said first cutting edge portion converges rearwardly with respect to said rotary axis and forms an angle of from 10 to 30 degrees with said first imaginary extension line.

3. A drill according to claim 2, wherein said first imaginary extension forms an angle of 60 to 90 degrees with said rotary axis.

4. A drill according to claim 1, wherein a distance from said first and second points is from 0.01 to 0.05 times said drill diameter, said acute angle being from 5 to 30 degrees.

5. A drill according to claim 4, wherein said acute angle is from 10 to 20 degrees.

6. A drill according to claim 1, wherein said second active cutting edge follows a path of travel during drill rotation that intersects a path of travel followed by said third cutting edge portion at a third point situated radially outside of and rearwardly of said second cutting edge portion.

7. A drill according to claim 1, wherein said first cutting insert is indexable and contains three sets of said first, second and third cutting edge portions.

8. A drill according to claim 7, wherein said second cutting insert is indexable and is of generally triangular shape, a bisector of said second active cutting edge converging rearwardly with respect to said rotary axis and forming an acute angle therewith.

9. A drill according to claim 1, wherein said first cutting insert is of generally parallelogram shape and contains two sets of said first, second, and third cutting edge portions, said sets interconnected by two parallel non-cutting edges, an imaginary center line passing parallel to said non-cutting edges being forwardly convergent with respect to said rotary axis.

10. A drill according to claim 9, wherein said second cutting insert is of generally rectangular shape and includes two cutting edges interconnected by two parallel non-cutting edges, an imaginary center line passing through a geometric center of said second cutting insert parallel to said non-cutting edges being rearwardly convergent with respect to said rotary axis.

11. A drill according to claim 2, wherein each of said first and second imaginary extension lines forms an angle with said rotary axis in the range of from 60 to 90 degrees.

12. A drill according to claim 11, wherein said angles formed by said first and second imaginary extension lines with said rotary axis are about 85 degrees.

13. A drill according to claim 1, wherein said first cutting edge portion overlaps said rotary axis.

* * * * *